US006719424B1

(12) United States Patent
Shin

(10) Patent No.: US 6,719,424 B1
(45) Date of Patent: Apr. 13, 2004

(54) LENS ATTACHMENT FOR EYEGLASSES

(76) Inventor: Phillip B. Shin, 2768 Rockpine La., La Crescenta, CA (US) 91214

( * ) Notice: Subject to any disclaimer, the term of this patent is extended or adjusted under 35 U.S.C. 154(b) by 0 days.

(21) Appl. No.: 10/425,197

(22) Filed: Apr. 30, 2003

(51) Int. Cl.$^7$ .................................................. G02C 9/00
(52) U.S. Cl. ........................................... 351/47; 351/57
(58) Field of Search .............................. 351/47, 48, 57, 351/58, 44, 41

(56) References Cited

U.S. PATENT DOCUMENTS 5,696,571 A * 12/1997 Spencer et al. ............... 351/47

* cited by examiner

*Primary Examiner*—Hung X. Dang
(74) *Attorney, Agent, or Firm*—Rapkin, Gitlin & Beaumont; Larry F. Gitlin

(57) ABSTRACT

An auxiliary lens apparatus for use with eyeglasses and sunglasses having two main lenses with respective convex and concave surfaces. The apparatus comprises two lenses each held within the individual rims of eyeglass frames and a nose bridge to join the two. A generally u-shaped clip with an integrally formed grooved seat and a rear flexible spur angled to abut the convex surfaces of each main lens is provided in combination with each auxiliary lens to fixably secure the auxiliary lenses to the eyeglasses. The un-shaped clip formed in combination with each auxiliary lens is situated to take into account the focal point of the wearer's eyes, which is located at a certain distance forward of the position of the clip, to prevent the obscuring of the wearer's vision.

11 Claims, 2 Drawing Sheets

LENS ATTACHMENT FOR EYEGLASSES

BACKGROUND OF THE INVENTION

1. Field of the Invention

The present invention relates generally to the field of optics and more particularly to an easily mountable and detachable auxiliary magnifying lens attachment for eyeglasses.

2. Description of the Prior Art

Supplemental or auxiliary magnifying lenses to enhance close up vision and devices and means to attach these types of lenses to eyeglasses are well known in the prior art.

Examples are found in the following disclosures:

U.S. Pat. No. 1,395,625 issued to Zimmerman Nov. 1, 1921 for a single lens attachment for eyeglasses;

U.S. Pat. No. 709,874 issued to Cohen Sep. 30, 1902 for a pair of supplemental lenses removably mountable to a pair of main lenses connected and supported by means of a nose bridge and shoulder elements on either end of the main frame;

U.S. Pat. No. 814,707 issued to Jackson Mar. 13, 1906 for a spectacles attachment;

U.S. Pat. No. 6,170,952 B1 issued to La Haye et al. Jan. 9, 2001 for adherent corrective lenses and eyeglasses embodying the same; and, U.S. Pat. No. 2,326,787 issued to Lorig Aug. 17, 1943 for detachable bifocals.

However, nothing in the prior art, including the above-referenced U.S. Patents, employs the device of the present invention for so easily associating auxiliary lenses with conventional eyeglasses and precluding against common types of lens damage while allowing the wearer to maintain normal vision through the upper or uncovered portion of the main lenses.

The present invention is directed to auxiliary lenses that can easily, safely and effectively demountably attach to a pair of eyeglass lenses and achieve its objectives without the deficiencies associated with the well known prior art devices.

SUMMARY OF THE INVENTION

In its preferred embodiment, the present invention provides an auxiliary lens apparatus for use with eyeglasses and sunglasses having two main lenses with respective convex and concave surfaces. The apparatus comprises two lens elements each held within eyeglass frames and a bridge member to join the two. A generally u-shaped clip with an integrally formed grooved seat and a rear flexible spur angled to abut the convex surfaces of each main lens is provided with each auxiliary lens to fixably secure the auxiliary lenses to the eyeglasses. The u-shaped clip formed with each auxiliary lens is situated to take into account the focal point of the eyes, which is located at a certain distance from the clip to prevent the obscuring of the wearer's vision.

Accordingly, it is an object of the present invention to provide an improved auxiliary lens apparatus.

Another object of the present invention is to provide an improved auxiliary lens apparatus with the means integrally formed with each of the auxiliary lenses to ensure the easy, safe and effective mount and release of the auxiliary lenses from conventional eyeglasses.

Still another object of the present invention is to provide an improved auxiliary lens apparatus that maintains physical separation between the auxiliary and main eyeglass lenses to prevent scratching or similar kinds of damage.

Still another object of the present invention is to provide an improved auxiliary lens apparatus that situates an integrally formed generally u-shaped clip member at the base of each auxiliary lens to take into account the focal point of the eyes, which could vary, though may, for example, be located at a distance of 10 to 14 inches from the clip, to prevent the obscuring of the wearer's vision.

Still another object of the present invention is to provide an improved auxiliary lens apparatus that allows the wearer to maintain normal vision through the upper or uncovered portion of the main lenses.

Still another object of the present invention is to provide an improved auxiliary lens apparatus that is adaptable for use with eyeglasses, sunglasses and other kinds of similar optics of various shapes and sizes.

Still another object of the present invention is to provide an improved auxiliary lens apparatus that is easy and cost effective to manufacture.

Other objects and advantages of the present invention will become apparent in the following specifications when considered in light of the attached drawings wherein the preferred embodiment of the invention is illustrated.

DETAILED DESCRIPTION OF THE PREFERRED EMBODIMENT

Figure 1:
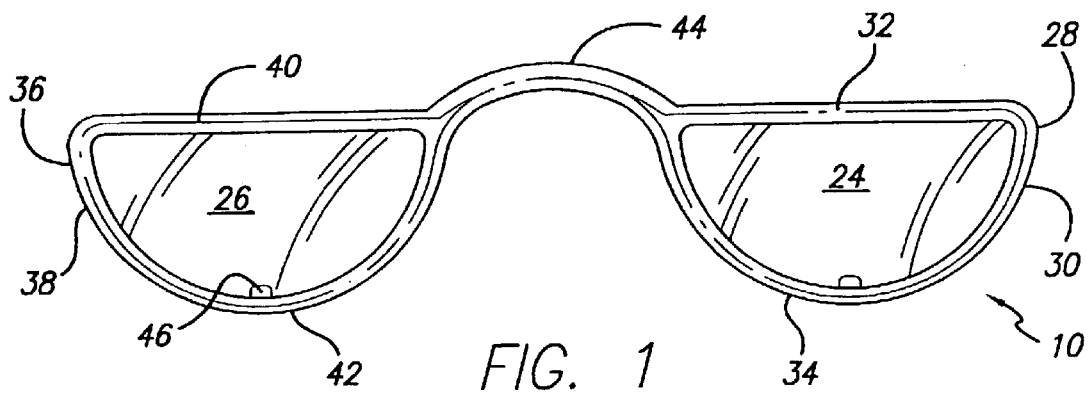
FIG. 1 is a front elevational view of the auxiliary lens apparatus according to the present invention.
Figure 2:
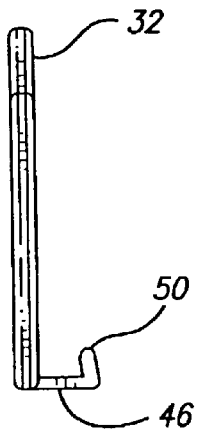
FIG. 2 is a side elevational view of the auxiliary lens apparatus according to the present invention.
Figure 3:
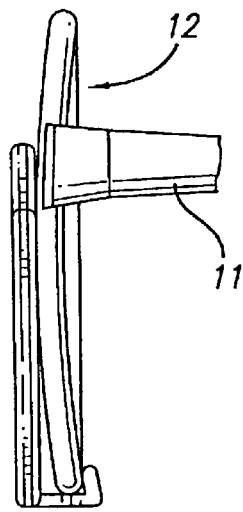
FIG. 3 is a side perspective view of the auxiliary lens apparatus according to the present invention mounted to conventional eyeglasses.
Figure 4:
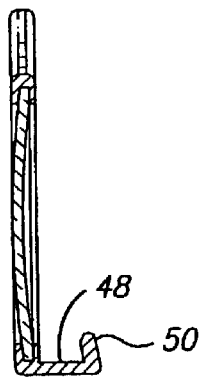
FIG. 4 is a side sectional view of the auxiliary lens apparatus according to the present invention.
Figure 5:
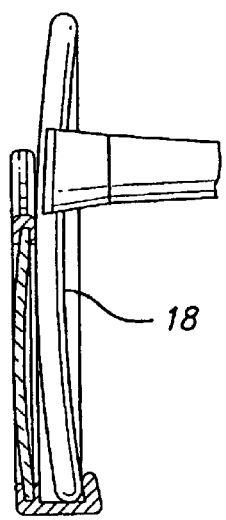
FIG. 5 is a side sectional view of the auxiliary lens apparatus according to the present invention mounted to conventional eyeglasses.
Figure 6:
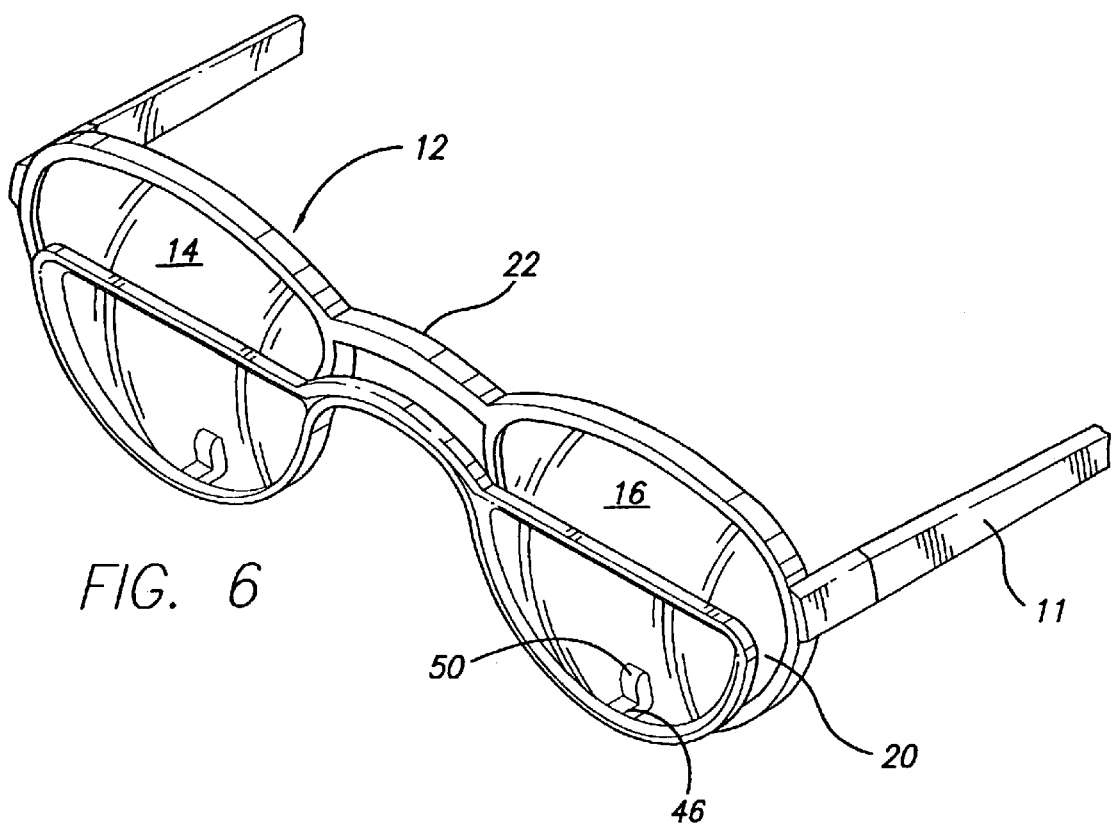
FIG. 6 is a perspective view of the auxiliary lens apparatus according to the present invention mounted to conventional eyeglasses.
Figure 7:
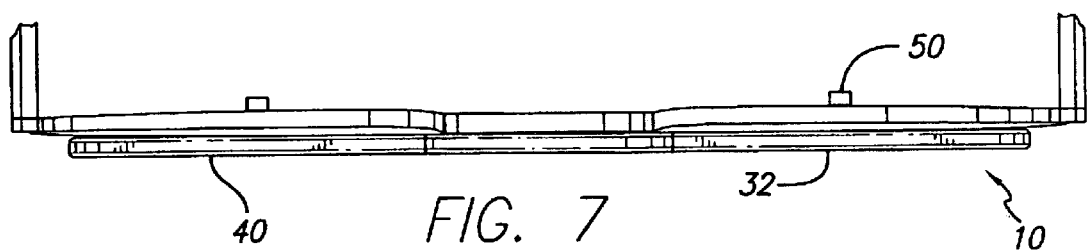
FIG. 7 is a top view of the auxiliary lens apparatus according to the present invention mounted to a pair of conventional eyeglasses.

Referring more particularly to the drawings, FIG. 1 is a perspective view of the present invention depicting auxiliary lens apparatus 10 for use with eyeglasses 12 having temples 11, a first main lens 14 and a second main lens 16 with respective convex surface 18 and concave surface 20 and a nose bridge 22. Auxiliary lens apparatus 10, comprises a first auxiliary lens 24, a second auxiliary lens 26, a first frame member 28 having a first rim 30 with a top bar 32 and a bottom curved member 34, a second frame member 36 having a second rim 38 with a top bar 40 and a bottom curved member 42, and a bridge portion 44, which joins and secures the first frame member 28 and the second frame member 36. Also provided is a u-shaped clip member 46, which is integrally formed with first frame member 28 and second frame member 36 for releasably engaging first main lens 14 and second main lens 16, respectively. Clip member 46 includes an integrally formed rear flexible spur 50, which is angled acutely for abutting engagement with each convex surface 18 of first and second main lenses 14 and 16, and seating first and second main lenses 14 and 16 and an integrally formed grooved seat 48 for fixably securing first and second auxiliary lens 24 and 26 to eyeglasses 12. Spur 50 cooperates with bottom curved members 34 and 42 individually to enhance and secure the close fit between auxiliary lens apparatus 10 and eyeglasses 12. As the angle of spur 50 becomes more. acute, the greater the pressure is brought to bear by the bottom curved members 34 and 42 against concave surface(s) 20 and, thus, the better the fit and the ability of these components to conform.

Figure 8A:
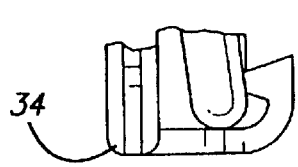
FIGS. 8a–8c show in section, from the side, three embodiments of the spur element according to the present invention.
Figure 8B:
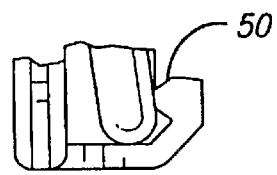
Figure 8C:
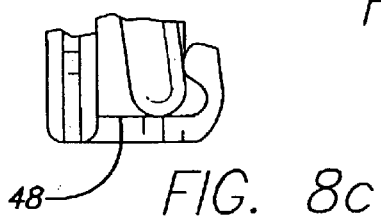

Spur 50, which may be constructed in a variety of useful configurations, such as those depicted in FIGS. 8a, 8b and 8c, is situated along bottom curved members 34 and 42 specifically for the purposes already described and also to avoid any noticeable interference with the wearer's vision. Since the wearer's focal point, which may vary, is usually located ten (10) to fourteen (14) inches forward of the position of spur 50, obstruction of the vision will be minimized, if not eliminated altogether.

To avoid scratching or otherwise damaging the surfaces of first and second auxiliary lenses 24 and 26, bottom curved members 34 and 42 act as the primary buffer element(s) against concave surface(s) 20 to maintain physical separation between first and second auxiliary lenses 24 and 26 and first and second main lenses 14 and 16, respectively. In certain cases, however, where the designs and/or specifications of the auxiliary lens apparatus 10 and/or eyeglasses 12 dictate, the components of first and second frame members 28 and 36, particularly top bars 32 and 40, may be reduced in size or entirely eliminated. In one such example, the thinning out or outright removal of the top bars 32 and 40 can result in the improvement of the wearer's vision.

First and second auxiliary lenses 24 and 26 are typically magnifiers used primarily for up-close reading or the like. These lenses may be designed for other uses as well.

The composition of the auxiliary or main lenses as well as the frames used for each may include natural and synthetic materials. Plastic and glass are the two most common alternatives for the lenses, while the frames may be comprised of any suitable flexible metal or synthetic polymer. One piece construction for the frames is the preferred model.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

What is claimed is:

1. A lens apparatus for use with eyeglasses having a first main lens and a second main lens with respective convex and concave surfaces and a nose bridge, comprising:

a first auxiliary lens and a second auxiliary lens;

a first frame member to hold said first auxiliary lens having a first rim with a top bar and a bottom curved member and a second frame member to hold said second auxiliary lens having a first rim with a top bar and a bottom curved member;

a bridge member to join said first frame member and said second frame member; and, a generally u-shape clip with an integrally formed grooved seat and a rear flexible spur angled acutely for abutting engagement with each of said first and second main lenses, respectively, and seating said first and second main lenses to fixably secure said lens apparatus to said eyeglasses.

2. The invention of claim 1 wherein said nose bridge is curved.

3. The invention of claim 1 wherein said first auxiliary lens is maintained in spaced apart relation from said concave surface of said first main lens and said second auxiliary lens is maintained in spaced apart relation from said concave surface of said second main lens to preclude against undermining the visual efficacy of said first and second main lenses.

4. The invention of claim 3 wherein said bottom curved member of said first frame member and said bottom curved member of said second frame member abut the concave surfaces of said first and second main lenses, respectively, to maintain separation between said first auxiliary lens from said first main lens and said second auxiliary lens from said second main lens.

5. The invention of claim 1 wherein said first and second auxiliary lenses are magnifiers.

6. The invention of claim 1 wherein said frame members are comprised of a synthetic material.

7. The invention of claim 1 wherein said frame members are comprised of metal.

8. The invention of claim 1 wherein said generally u-shape clip members are situated to minimize obscuring vision through said first and second main lenses.

9. The invention of claim 1 wherein said generally u-shape clip and said flexible rear spur integrally formed therewith are adapted to accommodate eyeglasses of various shapes and sizes.

10. The invention of claim 1 wherein the generally u-shape clip is situated to take into account the focal point of the eyes, which is located at a distance forward of said clip, to prevent the obscuring of vision.

11. The invention of claim 1 wherein said top bar of said first frame member and said top bar of said second frame member abut said first and second main lenses, respectively, to join and cooperate with said generally u-shape clip to fixably secure said lens apparatus to said eyeglasses.

* * * * *